June 15, 1965 K. A. STRZALA 3,188,743
GAUGING APPARATUS
Filed March 2, 1962 2 Sheets-Sheet 1

INVENTOR.
KAZIMER A. STRZALA
BY J. R. Nelson and
W. A. Schaich
ATTORNEYS

June 15, 1965  K. A. STRZALA  3,188,743
GAUGING APPARATUS

Filed March 2, 1962  2 Sheets-Sheet 2

INVENTOR.
KAZIMER A. STRZALA
BY J. R. Nelson and
W. A. Schaich
ATTORNEYS 3,188,743
GAUGING APPARATUS
Kazimer A. Strzala, Oakland, Calif., assignor to Owens-Illinois Glass Company, a corporation of Ohio
Filed Mar. 2, 1962, Ser. No. 176,997
10 Claims. (Cl. 33—174)

This invention relates to the inspection of containers and particularly to the inspection of hollow containers, such as glass bottles and jars, to determine whether the finish thereof is within proper specifications.

In the commercial use of hollow containers, such as glass bottles and jars, in high-speed handling and filling apparatus, it is essential that certain dimensions and tolerances be maintained in the manufacture of such containers and particularly in the upper surface of the container, commonly known as the finish. The critical tolerances include variation in height of the surface of the finish around the periphery thereof commonly known as warp and dip; the level or tilt of the finish, commonly known as cocked finish; and height.

In the copending application Serial No. 42,837, filed July 14, 1960, titled Bottle Gauging, by Richard L. Early and Thomas B. Sorbie and assigned to the assignee of the present application, there is disclosed and claimed a method and apparatus for simultaneously gauging the finish of a container to check for excessive warp, dip, cocked finish and height. Basically, the invention disclosed and claimed in that application comprises scanning the finish of the container, creating a voltage signal in response to the variation in height of the finish of the container, and analyzing and comparing said variation in voltage to determine whether it exceeds predetermined limits which would require rejection of the container. In the aforementioned application, the container is brought into position adjacent a head which has a plurality of contact members in the form of rollers thereon that contact and scan the finish of the container. One of the rollers is connected to the core of a differential transformer and the movement of the roller and, in turn the core, creates the alternating current voltage signal as output of the differential transformer. This signal is then analyzed and compared with standards to determine whether the container should be rejected.

It is an object of this invention to provide a novel gauging apparatus.

It is a further object of the invention to provide an improved head for supporting the contact members.

It is a further object of the invention to provide such a head which utilizes a minimum of space, thus permitting access to other portions of the finish of the container for other inspections, such as optical inspections.

It is a further object of the invention to provide such an apparatus that has a minimum number of parts.

It is a further object of the invention to provide such an apparatus wherein there is a minimum degree of required movement between the rollers and the containers.

Basically, the gauging apparatus comprises a rotatable pad on which a container to be gauged is positioned. A pair of parallel arms are pivoted about parallel coincident axes adjacent the pad and each arm carries a roller which engages the finish of the container. One of the rollers functions to stabilize the container as it rotates and the other roller functions through its arm to transmit a position to an electrical sensing device, such as a differential transformer. The arms preferably extend in the same direction and the rollers extend diametrically of the container.

Figure 1:
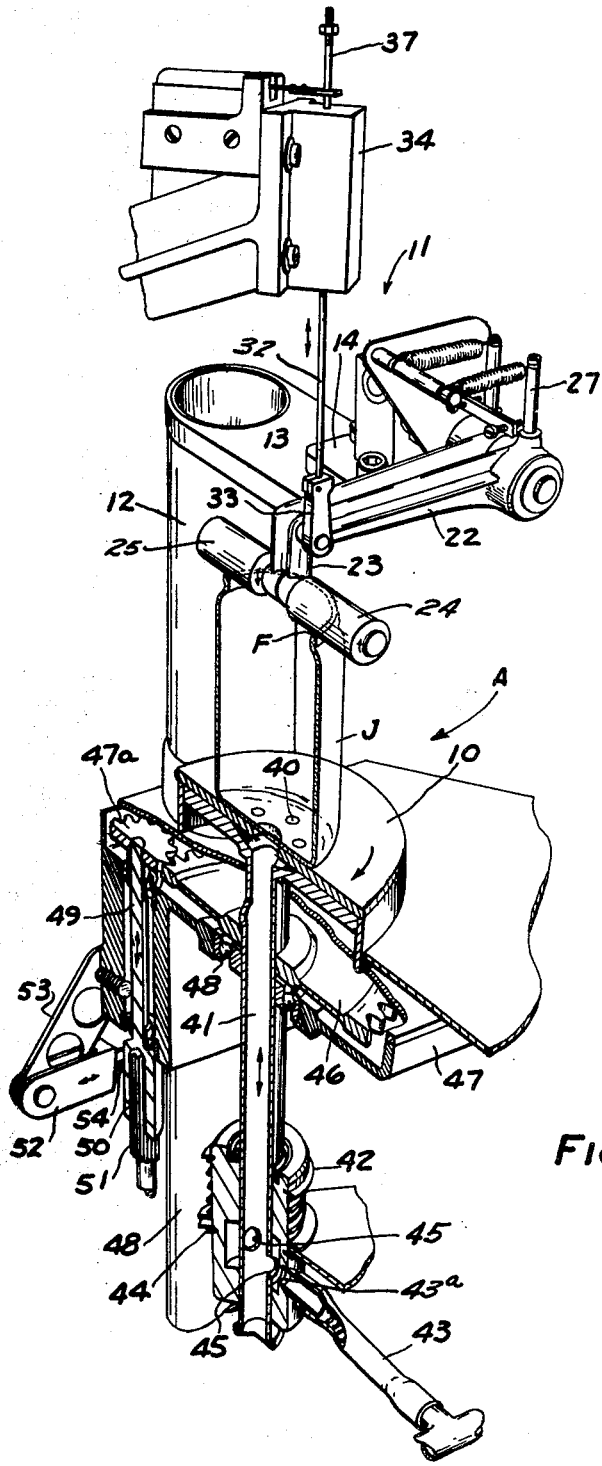
FIG. 1 is a part sectional perspective view of an apparatus embodying the invention.

Referring to FIG. 1, the gauging apparatus is intended to inspect hollow containers, such as glass jars J, of the type having an open upper end defining what is commonly termed as a finish. The jars J are brought into gauging position by a bottle transfer mechanism which can be of the type shown and described in the patent to Fedorchak et al. 2,682,802.

The gauging apparatus comprises a pad or support 10 to which the jar J is brought by the transfer mechanism. The support 10 is adapted to move upwardly and downwardly to receive the jar J in its lower position and move it upwardly for gauging in its upper position.

Figures 2, 3:
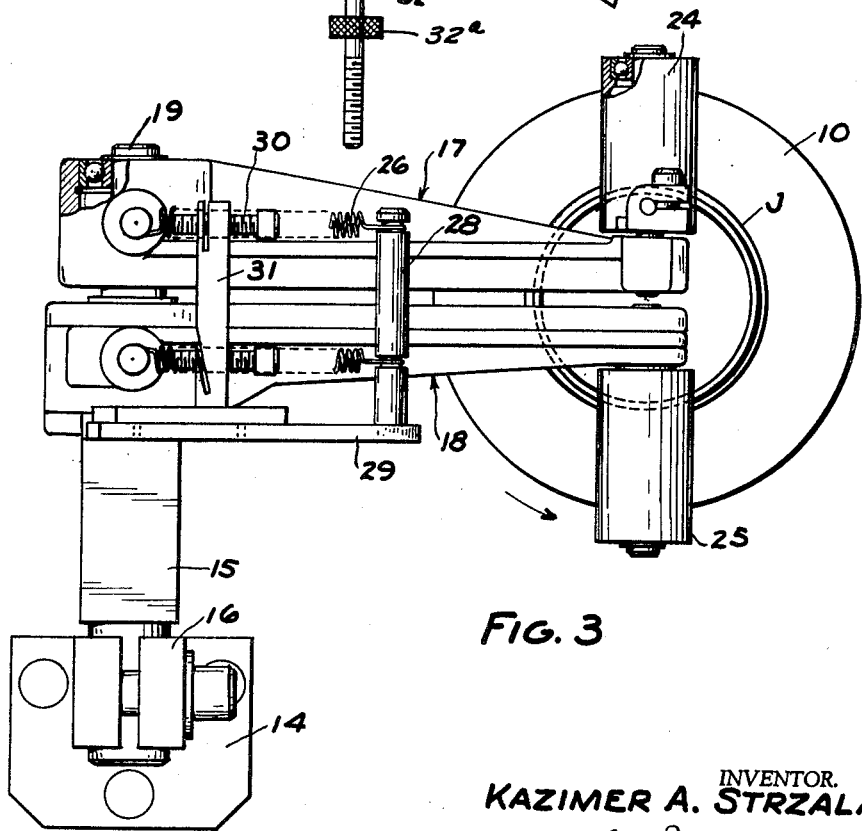
FIG. 2 is a part sectional elevation of the upper portion of the apparatus shown in FIG. 1.
FIG. 3 is a plan view of the apparatus, parts being broken away.

An inspecting head 11 is mounted on a vertical support 12 and comprises a plate 13 fixed to the upper end of the support 12 and a bracket 14 fastened to the plate 13. A cross shaft 15 is fixed to the bracket 14 by a clamp 16 (FIG. 3). A pair of arms 17, 18 are pivoted on the end 19 of the shaft 15 for swinging movement about a common horizontal axis spaced from and adjacent to the support 10. As shown in the drawings, each arm 17, 18 is generally L-shaped and includes a long horizontal portion 22 and a short vertical portion 23. Cylindrical rollers 24, 25 are mounted on the lower ends of the short portions 23 of the arms 17, 18 with their axes in alignment and extending horizontally outwardly from the arms. The common axis of the rollers 24, 25 is parallel to a diameter of the pad 10 and, in turn, the jar J.

Each arm is yieldingly urged downwardly by a tension spring 26 which has one end thereof fastened to an upstanding pin 27 extending radially from the pivoted end of the arm. The other ends of springs 26 are fastened to a horizontal pin 28 fixed to a plate 29 on the shaft 15. Adjustable stops are provided for determining the lowermost position of each arm and, in turn, the roller thereon. Each stop comprises a screw 30 threaded into a narrow plate 31 extending horizontally outwardly from the plate 29. The springs 26 thus yieldingly urge the pins 27 against the ends of the screws 30 which limit the downward swinging movement of the arms 17, 18.

When a jar J is on the support 10 and the support 10 is elevated, the finish F of the jar J is brought into contact with the rollers 24, 25. As the support 10 is rotated, the rollers are caused to traverse the finish. One of the rollers 24 is connected to a link 32 of plastic or other nonmagnetic material by a swivel member 33. Link 32 extends upwardly into a bracket 34 that supports a signal device, such as a differential transformer 35. The upper end of the link 32 is threaded into a core 36 of the transformer. An extension link 37 is threaded into the upper end of the core and projects through the top of the brackets 34 and a nut 38 is threaded on the end thereof. Link 32 is easily adjustable in member 33 for adjusting core 36 of the transformer for a particular bottle height. The knurled portion 32a on the link is for convenience in making a hand adjustment of this nature. The nut 38 engages a spring arm 39 to actuate a microswitch 40 and deenergize the transformer when the link 32 is in its lowermost position.

Differential transformer 35 and its operation is of conventional construction and is more fully described in the aforementioned application. Such differential transformers conventionally comprise a primary and a pair of secondary windings connected in series. There is a neutral position of the core 36 so that, when the core 36 is moved up and down, a positive or negative signal is created with respect to the neutral position. In the above arrangement, the position of the core 36 corresponds to the height of the finish of the jar J at any predetermined point and therefore the height of the container at any predetermined point is indicated by the output of the transformer. If the container J has an excessive warp finish, then the core 36 will move more than a predetermined amount. If the container J has an excessive dip in the finish, then the core 36 will move more than a predetermined degree of peripheral movement of the roller less than the peripheral distance in measuring for warp finish. If the container J has an excessive cocked surface, then the core 36 will have an excessive movement between its uppermost position and its lowermost position in a predetermined degree of peripheral movement of the roller. If the height of the container J is beyond predetermined limits, then the core 36 will move upwardly or downwardly beyond a predetermined amount. These movements are converted into voltage signals by the differential transformer and transmitted to an electronic mechanism, such as shown in the aforementioned copending application, which compares the signals and rejects the container in the event that the container is not within predetermined limits.

During the inspection by the roller 24 traversing the finish F, the roller 25 serves as a stabilizing roller to hold the container in position on the support 10.

In addition, in order to facilitate the positioning and holding of the container J on the support 10, support 10 is made hollow and vacuum is supplied to the support 10 through a vertical tube 41. Openings 40 in the top of support 10 apply the vacuum to a container J. The tube 41, in turn, extends downwardly through a fixed header member 42 to which vacuum 43 is applied through a supply pipe 43. Pipe 43 communicates with a space 44 in the header 42 which, in turn, communicates with the interior of the tube through openings 45 in tube 41. By this arrangement, when the support 10 is rotated in its raised position, vacuum is continuously applied to the openings 40. The vacuum is automatically shut off upon lowering support 10 which moves the diametrically located openings 45 below space 44 and out of communication with vacuum supply pipe 43.

As shown in FIG. 1, the support 10 is fixed to a gear 46 and the tube 41 is rotatably mounted in a movable frame 47, through which tube 41 extends, by bearings 48. The gear 46 is, in turn, driven by a pinion 46a rotatably mounted in the frame 47 which is movable upwardly and downwardly on a base 48. Shaft 49 on which the gear 47 is fixed is connected by a spline to a drive shaft 51. The moving frame 47 is moved upwardly and downwardly by a linkage which includes a horizontally reciprocating rod 54 connected by a link 53 to the moving frame 47. When the rod 54 is moved to the right, as shown in FIG. 1, the frame 47 is elevated carrying the pinion 47, gear 46 and support 10 upwardly. As the support 10 is elevated, tube 41 is moved upwardly bringing opening 45 into communication with supply pipe 43.

By this arrangement, access is provided to a great portion of the periphery of the finish during the inspection. This is more clearly brought out in FIG. 3. Thus, it is possible to position additional inspection apparatus at the same station. For example, optical inspection apparatus can be provided at the inspection station. Also, the elongated rollers will readily gauge a variety of diameters of finish of jars J, without alteration or adjustment of the mechanism.

In addition, the arrangement provides for a very simple scanning of the finish. Since the arms 17, 18 are swung about a horizontal axis adjacent and not overlying the support 10, it is possible to move the jar J into position on the support without interference from the frame that supports the arms so that very little movement of the support 10 upwardly and downwardly is required. In fact, with precise adjustment, it is possible to move the container under the rollers onto the support 10 without any vertical movement of the support 10. This can be achieved by moving the jar J in the direction of the arrows shown in FIG. 3 when it is supplied to the support 10, that is, generally parallel to arms 17, 18 and extending away from shaft 15 in the same direction as arms 17, 18.

I claim:
1. In a container gauging apparatus,
the combination comprising a support on which a container is adapted to be positioned for inspection,
means for rotating said support,
a pair of arms,
means for pivotally supporting said arms about coincident axes adjacent said support and spaced laterally of said container when on said support with the arms extending into overlying relationship with said support,
means on each said arm overlying said support and adapted to engage the finish of a container positioned on said support,
means associated with at least one of said arms for producing an electrical signal in accordance with the position of said contact member,
said support having a plurality of openings in the top surface thereof,
means for supplying vacuum to said openings for holding said container on said support comprising a tube extending downwardly from said support and fixed thereto,
the interior of said tube communicating with the openings in said support,
said tube being adapted to rotate with said support,
and a header,
said header and tube being movable axially relative to one another,
means for applying vacuum to said header,
said tube having an opening therein communicating with said header in one position of said tube relative to said header when a container is in gauging position against said arms whereby the vacuum is applied to the interior of said tube.

2. In a container gauging apparatus,
the combination comprising a pad,
means for rotating said pad and thereby rotating a container positioned on said pad,
a pair of arms,
means for mounting said arms for swinging movement about a substantially horizontal axis adjacent said pad and spaced laterally of said container when on said pad whereby said arms overlie a part of said pad,
a roller on each said arm extending horizontally and adapted to engage the finish of a container positioned on said pad,
said rollers having their axes aligned with one another and in alignment with a diameter of said pad,
means operatively connected to one of said arms for producing an electrical signal in accordance with the positioning of one of said arms,
said support having a plurality of openings in the top surface thereof,
means for supplying vacuum to said openings for holding said container on said support comprising a tube extending downwardly from said support and fixed thereto,
the interior of said tube communicating with the openings in said support,
said tube being adapted to rotate with said support,
and a header,
said header and said tube being movable axially relative to one another
means for applying vacuum to said header,
said tube having an opening therein communicating with said header in one position of said tube relative to said header whereby the vacuum is applied to the interior of said tube.

3. In a container gauging apparatus,
the combination comprising a support on which a container is adapted to be positioned for inspection,
means for rotating said support,
a pair of arms,
means for pivotally supporting said arms about parallel axes adjacent said support and spaced laterally of said container when on said support with the arms extending into overlying relationship with said support,
means on each said arm extending horizontally and overlying said support and adapted to engage the finish of a container positioned on said support,
said support having a plurality of openings in the top surface thereof,
means for supplying vacuum to said openings for holding said container on said support comprising a tube extending downwardly from said support and fixed thereto,
the interior of said tube communicating with the openings in said support,
said tube being adapted to rotate with said support,
and a header,
said tube and said header being movable axially relative to one another means for applying vacuum to said header,
said tube having an opening therein communicating with said header in one position of said tube relative to said header when a container is in gauging position adjacent said arms whereby the vacuum is applied to the interior of said tube.

4. In a container gauging apparatus,
the combination comprising a pad,
means for rotating said pad and thereby rotating a container positioned on said pad,
a pair of arms,
means for mounting said arms for swinging movement about a, substantially horizontal axis adjacent said pad and spaced laterally of said container when on said pad whereby said arms overlie a part of said pad,
a roller on each said arm extending laterally and adapted to engage the finish of a container positioned on said pad,
said rollers having their axes parallel and in alignment with a diameter of said pad,
said support having a plurality of openings in the top surface thereof,
means for supplying vacuum to said openings for holding said container on said support comprising a tube extending downwardly from said support and fixed thereto,
the interior of said tube communicating with the openings in said support,
said tube being adapted to rotate with said support,
and a header,
said tube and said header being movable axially relative to one another means for applying vacuum to said header,
said tube having an opening therein communicating with said header in one position of said tube relative to said header whereby the vacuum is applied to the interior of said tube.

5. In a container gauging apparatus for inspecting the upper surface of the annular finish on the upper end of an open mouth container for refects such as warp, dip, cocked finish and height,
the combination comprising a support on which a container is adapted to be positioned for inspection,
means for rotating said support about a vertical axis,
a pair of arms,
means for pivotally supporting said arms for independent movement about common horizontal axes adjacent said support and spaced laterally from the axes of said container when on said support with the arms extending into overlying relationship with said support,
means on each said arm overlying said support and adapted to contact spaced points on the upper surface of the finish of a container positioned on said support,
said means engaging said finish at diametrically spaced points,
and means associated with at least one of said arms for producing a signal in accordance with the vertical position of said contact member.

6. The combination set forth in claim 5 wherein each said contact means comprises a roller having its axis extending horizontally and lying in a radial plane of said support.

7. The combination set forth in claim 5 wherein said support is movable vertically up and down for moving said container into and out of container gauging position.

8. In a container gauging apparatus for inspecting the upper surface of the annular finish on the upper end of an open mouth container for defects such as warp, dip, cocked finish and height,
the combination comprising a pad,
means for rotating said pad about a vertical axis and thereby rotating a container positioned on said pad,
a pair of arms,
means for mounting said arms for independent swinging movement about a common substantially horizontal axis adjacent said pad and spaced laterally from said container when on said support whereby said arms overlie a part of said pad,
a contact member on each said arm adapted to engage the finish of a container positioned on said pad,
said contact members engaging said finish at diametrically spaced points,
and means operatively connected to one of said arms for producing an electrical signal in accordance with the position of one of said arms.

9. The combination set forth in claim 8 including means for limiting the downward swinging movement of each of said arms.

10. The combination set forth in claim 8 including means for yieldingly urging said arms into their lowermost position.

References Cited by the Examiner
UNITED STATES PATENTS

| | | | |
|---|---|---|---|
| 2,127,161 | 3/38 | Cook | 33—21 |
| 2,366,394 | 1/45 | Gerber | 33—174 |
| 2,772,484 | 12/56 | Cargill et al. | 33—174 |
| 2,820,297 | 1/58 | Anderson | 33—148 |
| 2,988,218 | 6/61 | Fedorchak et al. | 33—174 |
| 3,073,034 | 1/63 | Antoszewski | 33—174 |

ISAAC LISANN, *Primary Examiner.*